United States Patent
Waters et al.

(10) Patent No.: US 9,740,261 B2
(45) Date of Patent: Aug. 22, 2017

(54) USB POWER DELIVERY DEAD-BATTERY CONTROL

(71) Applicant: Texas Instruments Incorporated, Dallas, TX (US)

(72) Inventors: Deric Wayne Waters, Dallas, TX (US); Roy Alan Hastings, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 207 days.

(21) Appl. No.: 14/841,119

(22) Filed: Aug. 31, 2015

(65) Prior Publication Data
US 2017/0060216 A1    Mar. 2, 2017

(51) Int. Cl.
G06F 1/30        (2006.01)
G06F 1/32        (2006.01)
G06F 1/26        (2006.01)

(52) U.S. Cl.
CPC .......... *G06F 1/30* (2013.01); *G06F 1/266* (2013.01); *G06F 1/3293* (2013.01)

(58) Field of Classification Search
None
See application file for complete search history.

(56) References Cited

U.S. PATENT DOCUMENTS

| 2011/0279095 A1* | 11/2011 | Hong | G06F 13/385 320/164 |
|---|---|---|---|
| 2012/0030381 A1 | 2/2012 | Singh et al. | |
| 2013/0290765 A1* | 10/2013 | Waters | G06F 1/263 713/340 |
| 2014/0208134 A1 | 7/2014 | Waters et al. | |

FOREIGN PATENT DOCUMENTS

WO    2008117139 A3    10/2008

OTHER PUBLICATIONS

International Search Report for PCT/US2016/049674 filed Dec. 15, 2016.

* cited by examiner

*Primary Examiner* — Kim Huynh
*Assistant Examiner* — Paul J Yen
(74) *Attorney, Agent, or Firm* — John R. Pessetto; Charles A. Brill; Frank D. Cimino

(57) ABSTRACT

A method of power delivery. Port controllers each include a state machine, an IO pin, a receptacle supply pin receiving power from a receptacle, and a gate driver pin coupled to a control node of a power path switch each having an output coupled to a load. The state machines implement a dead-battery control (DBC) algorithm upon sensing a DB condition. The DBC algorithm pulls up the IO pin, starts a timer for T1, and monitors the IO pin for T1. If the IO pin is pulled low, the port controller is reset for a pulled low period, the DBC algorithm is then restarted or its IO pin is monitored until not pulled low for T1. One port controller pulls its IO pin low for an assertion period to claim priority over the other port controller, and closes its associated power path switch to exclusively provide power to the load.

13 Claims, 4 Drawing Sheets

USB POWER DELIVERY DEAD-BATTERY CONTROL

FIELD

Disclosed embodiments relate to power delivery dead-battery control.

BACKGROUND

New universal serial bus (USB) power-delivery (PD) and Type-C specifications have been released that enable delivery of higher electrical power over new USB cables and connectors. The intent for this technology is to create a universal power plug for laptops, tablets and other devices that may require more than a 5V power supply.

The USB-PD specification defines a communication link between ports connected via a USB-PD cable and connectors. The communication is designed to be half-duplex and packet-based. The packets contain various information that enables the source port and sink ports to communicate and negotiate the voltage and current the source port will provide to the sink port. The ports can negotiate to switch roles (i.e., the source port to become the sink port and vice versa).

The underlying communication in the USB PD specification is Biphase Mark Coding (BMC). The USB-PD communication goes over a different wire (e.g., the secondary Cable Connection (CC2) wire) rather than the USB data wires. For USB Type-C cables up to 15 W of power can be delivered even without USB PD messaging by controlling the DC voltage on the CC pin.

FIG. 1 shows a block diagram of a known USB PD system 100 after downstream facing port/source (DFP) 110 to upstream facing port/sink (UFP) 120 attachment via a cable 105 that utilizes BMC signaling for PD. The DFP 110 is shown implemented with a resistive pull-up (shown as Rp) to its CC pin, which can also be a current source. A power supply 125 supplies power to the Vbus line that is received across the load (or power sink) 130 via the cable 105. A DC voltage on the CC line is established by the Rp on one end of the cable 105 and a resistive pull-down shown as Rd between the CC pin and ground on the other end of the cable. The power supply is shown as a 3.3V DC supply coupling through $R_P$ and Rd. There are other lines that may be present in the cables shown as data lines that are not relevant to this Disclosure.

Some battery-operated mobile devices utilize more than one USB Type-C receptacle and the USB PD protocol. Some systems also implement the Type-C and PD capabilities using an analog frontend or port controller coupled to a microcontroller (or other processor) that acts as a master in the PD system. In typical scenarios the port controller is a slave to the microcontroller, where the microcontroller tells the port controller when to turn on or off any power-path switch or input/output pin typically referred to as a general-purpose input/output (GPIO) pin. The microcontroller may use the same Inter Integrated Circuit Communications (I2C) bus to control multiple (e.g., 2) port controllers.

There are cases where such a load's 130 battery is removed or drained of any charge. This is referred to herein as the dead-battery scenario. In the dead-battery scenario, the PD system 100 needs a way to receive power from the VBUS pin of one (and only one) of its Type-C receptacles (or connectors). The port controller connects the VBUS pin of the Type-C receptacle into the power system of the device so that it can begin functioning properly. This means that the port controller needs to take some autonomous action in the dead-battery scenario. The port controller detects this dead-battery scenario by the presence or absence of $V_{DD}$ at its $V_{DD}$ supply pin. If no voltage is applied to the $V_{DD}$ supply pin which is typically directly connected to a positive DC power supply (e.g., 3.3 V), but power is applied to the $V_{PWR}$ pin of the port controller, then the port controller operates as if it is in a system with a dead-battery.

In some system architectures there are first and second port controllers in a system architecture where both port controllers are driving a power-path switch for the same power-path. The power-path is designed so that only one port's power-path switch may be closed, where the design intends for "collisions" to be avoided. Collisions may be avoided by coupling the respective port controllers so that they recognize each other and the first port controller that can provide power to the power system sink takes control of supplying power. Known system architectures having first and second port controllers and at least one power-path switch coupling to a power path sink (load device) typically use current sources and voltage detectors to measure the voltage level to avoid collisions.

SUMMARY

This Summary briefly indicates the nature and substance of this Disclosure. It is submitted with the understanding that it will not be used to interpret or limit the scope or meaning of the claims.

Disclosed embodiments recognize known power delivery (PD) systems with a first port controller and a second port controller that have current sources and voltage detectors to measure the voltage level can sometimes avoid port controller collisions where more than one port controller is in control at any given time. However, such PD systems lack robustness and do not guarantee collisions will not take place, particularly when their master controller is unresponsive. Although the master controller (sometimes called an embedded controller) is designed to avoid collisions when it is responsive, if the master controller is unresponsive (e.g., the system battery is dead) so that both port controllers have their associated power-path switches closed at the same time, then the port controller with the power supply providing the smaller magnitude voltage connected to the port controller having a larger magnitude voltage may be damaged due to the resulting reverse current.

Disclosed PD systems include a system architecture and the port controllers implementing a disclosed dead-battery control (DBC) algorithm that enables cooperation between the port controllers so that when their master defined herein as an external process such as run by a microcontroller is unresponsive (e.g., the system's battery is dead) collisions still are avoided. The coupling between the port controllers can be such that during a dead-battery event they recognize each other and the first of the respective port controllers that can provide power to the power system sink takes control and exclusively provides power to the power sink.

BRIEF DESCRIPTION OF THE DRAWINGS

Reference will now be made to the accompanying drawings, which are not necessarily drawn to scale, wherein.

DETAILED DESCRIPTION

Figure 1:
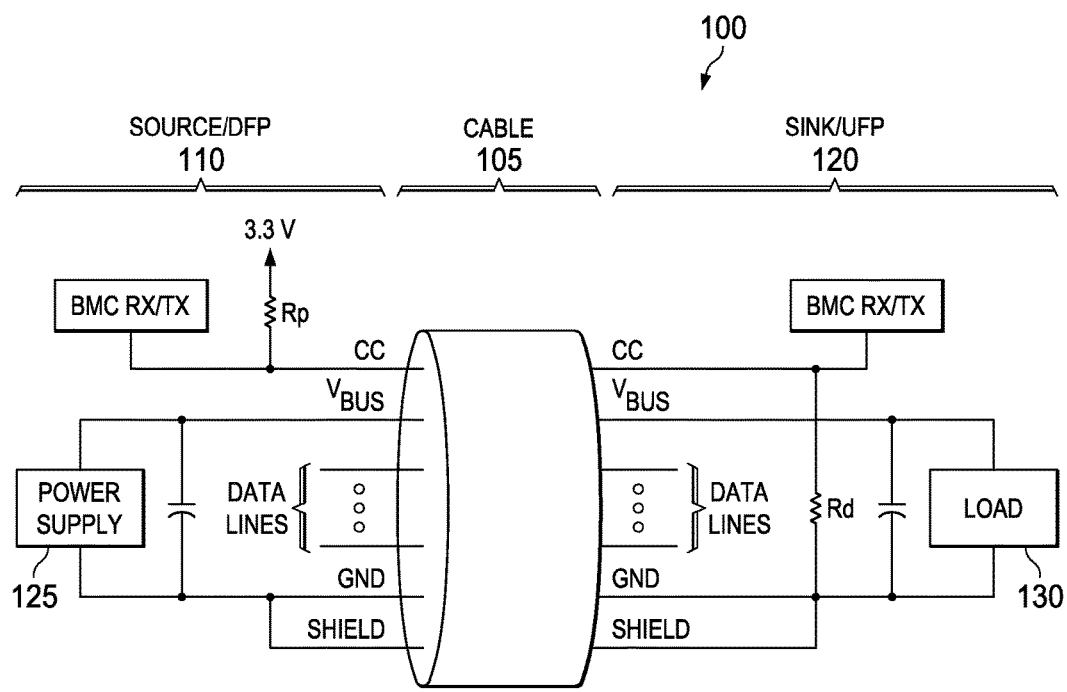
FIG. 1 shows a block diagram of a known USB PD system after downstream facing port/source (DFP) to upstream facing port/sink (UFP) attachment via a cable.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Figure 2A:
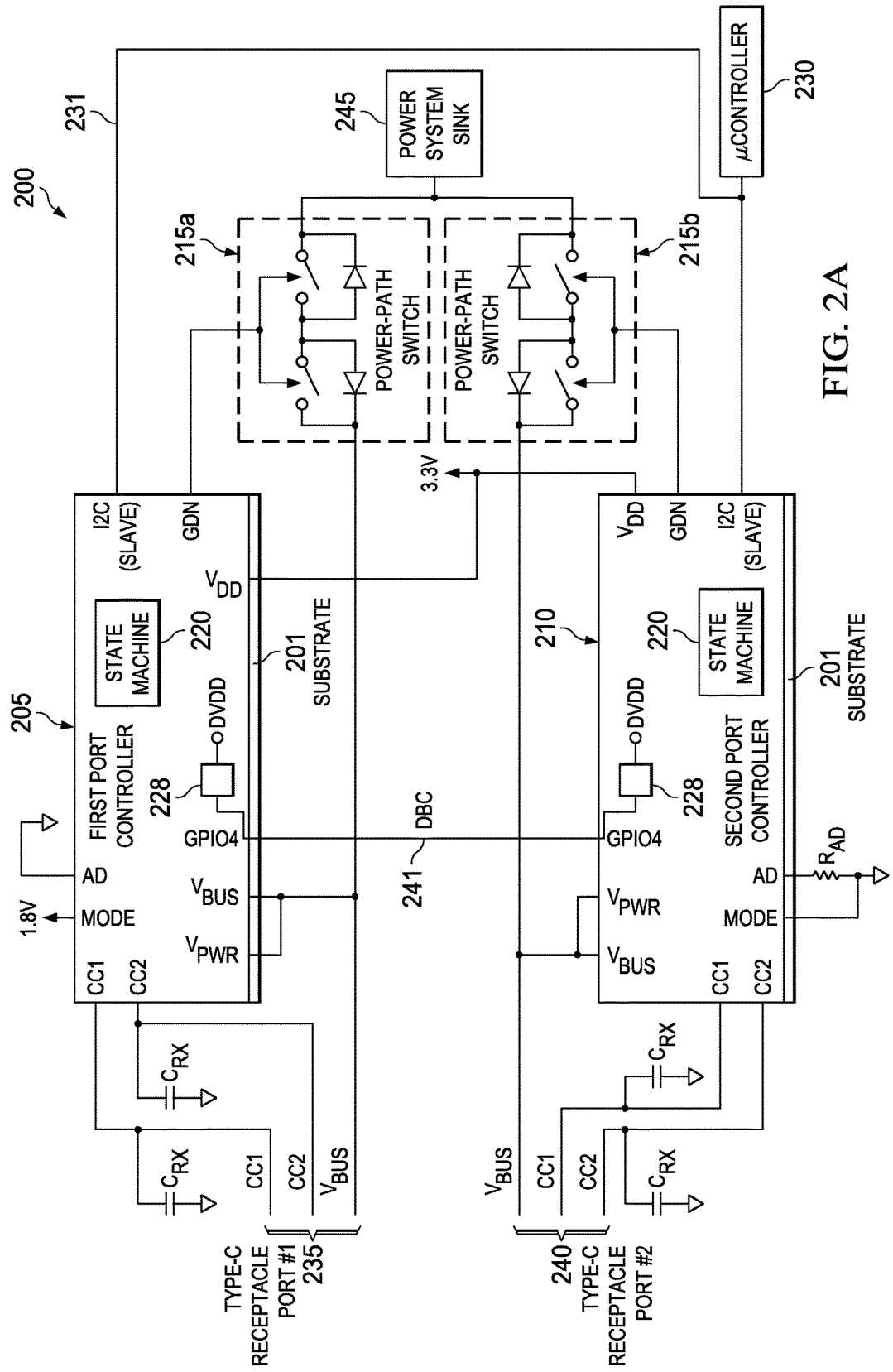
FIG. 2A is a PD system schematic embodiment where each of the port controllers includes a state-machine and a gate driver pin for driving control nodes of a different power-path switch, according to an example embodiment.

FIG. 2A shows an example PD system 200 where each port controller shown as first port controller 205 and second port controller 210 includes a state-machine 220, and has a gate driver pin shown as GDN for driving control nodes of a different power-path switch 215a, 215b, according to a disclosed embodiment. The DBC mechanism uses the level on the port controllers' input/output pin referred herein as a general purpose IO (GPIO) pin that are shown herein as GPIO4 pins which in FIG. 2A are directly coupled to one another. Because of this direct coupling, during a DB event the port controllers recognize each other and the first of the respective port controllers that can provide power to the power system sink takes control and exclusively provides power to the power sink.

The DBC mechanism resides in the port controllers 205, 210 and uses the port controllers' GPIO pins shown as GPIO4 pins to ensure that only one power-path switch is connected to the power system sink 245 at any given time. The power-path switches 215a, 215b can comprise N-channel MOSFET(s), where the GDN pin can directly control the voltage level on the gate of the N-channel MOSFET(s). Alternatively, a GPIO (not GPIO4) can control a load switch IC or a gate driver pin can control a P-channel MOSFET. A further alternative is a low voltage GPIO pin for driving a P-channel MOSFET which then drives an N-channel MOSFET. The port controllers 205, 210 are each shown including an internal pull-up block 228, such as comprising a large resistor, connected between the GPIO4 pins and DVDD (which is shown as an internally regulated voltage). A "large resistor" is defined herein as being at least 10 kohms, such as being 50 kohms.

PD system 200 includes a processor 230 shown as a μ controller that is the master of an Inter Integrated Circuit Communications (I2C) bus 231 which provides I2C master signals to the I2C slave pins of the respective port controllers 205 and 210. A unique I2C slave address is hard coded into the respective port controllers 205, 210, such as by pulling an input pin shown as the AD pin differently. Port controllers 205 is shown having its AD pin grounded, while port controller 210 is shown having its AD pin connected to ground through as resistor shown as $R_{AD}$. PD system 200 receives power shown as $V_{BUS}$ from the $V_{BUS}$ pins of the Type-C receptacles (receptacles) 235, 240 that is also coupled an input node of the power-path switches 215a and 215b. $V_{PWR}$ is a pin on the port controllers 205, 210, the receptacles 235, 240 are shown having a $V_{BUS}$ pin, and the port controllers 205, 210 are also shown having a $V_{BUS}$ pin. The $V_{PWR}$ and $V_{BUS}$ pins of the port controllers 205, 210 are shown tied together, although they can be separate pins for separate connections. Disclosed port controllers can be implemented as integrated circuits (ICs) on a substrate having a semiconductor surface, shown as substrate 201, typically a silicon substrate with an optional silicon epitaxial layer.

Based on the state of their MODE pins, with the MODE pin of port controller 205 shown coupled to a 1.8 V power supply and MODE pin of port controllers 210 coupled to ground, the port controllers 205 and 210 in this embodiment turn on their GDN pin in the DB scenario. The biasing difference for the respective MODE pins shown (or some other MODE pin biasing difference, or a bias difference to the AD pins) is to ensure that the respective port controllers 205, 210 do not use the same timings to avoid turning on their respective GDN pins at the same time which can cause collisions. As described below, the MODE pin or AD pin bias gives each port controller its unique I2C address and this in turn sets the timings by determining a unique tCycle values for each port controller 205, 210. Accordingly, in contrast to that shown in FIG. 2A (and FIG. 2B described below), the controller's 205, 210 AD pins can be pulled differently to provide different hard coded I2C slave addresses, with the respective MODE pins biased the same on both port controllers 205 and 210

There is no direct relation between GPIO4 and MODE pins so that one can have one without the other. If the $V_{BUS}$ and $V_{PWR}$ pins of only receptacle 235 associated with port controller 205 is powered, but not $V_{DD}$, then that power on the $V_{BUS}/V_{PWR}$ pins is routed into the power system sink 245 via power-path switch 215a.

However, as noted above, there is a potential for a collision if both receptacles 235, 240 have power on their $V_{BUS}$ pins and their processor 230 is unresponsive. Therefore, it is recognized it can be important that both port controllers 205 and 210 not have their GDN pins both turned on at the same time in the dead-battery scenario. To enable the two port controllers 205 and 210 to coordinate (synchronize) the closing (i.e., turning on) of their GDN pins so that only 1 GDN pin is on at most at any given time, in PD system 200 the port controllers 205, 210 are directly coupled together via a wire referred to as a DBC wire 241 that is shown positioned to connect together the GPIO4 pins of port controllers 205 and 210. Although it is also possible for the DBC wire 241 to be replaced by a wireless connection by adding a wireless transceiver for each port controller, a wireless transceiver is likely to more complicated than the port controller.

A state-machine 220 is shown implemented inside each port controller 205, 210 that uses the signal on the DBC wire 241 to coordinate the two port controllers 205, 210 so that only one of the port controllers 205 and 210 is on (GDN pin turned on) at any given time. The state machine 220 or other components of disclosed port controllers can be implemented in hardware or a suitable combination of hardware and software, and can utilize one or more integrated circuits (ICs) built on a substrate 201 that has at least a semiconductor surface. As noted above, the substrate 201 may comprise silicon, such as bulk silicon or silicon epi on a bulk silicon substrate. The substrate may also comprise other materials, such as elementary semiconductors besides silicon including germanium. The substrate may also comprise a compound semiconductor.

As used herein and by way of example and not by limitation, "hardware" can include a combination of discrete components, an integrated circuit, an application-specific integrated circuit, a field programmable gate array, a general purpose processing or server platform, or other suitable hardware. As used herein and by way of example and not by limitation, "software" can include one or more objects, agents, threads, lines of code, subroutines, separate software applications, one or more lines of code or other suitable software structures operating in one or more software applications or on one or more processors, or other suitable software structures. In one example embodiment, software can include one or more lines of code or other suitable software structures operating in a general purpose software application, such as an operating system, and one or more lines of code or other suitable software structures operating in a specific purpose software application.

Figure 2B:
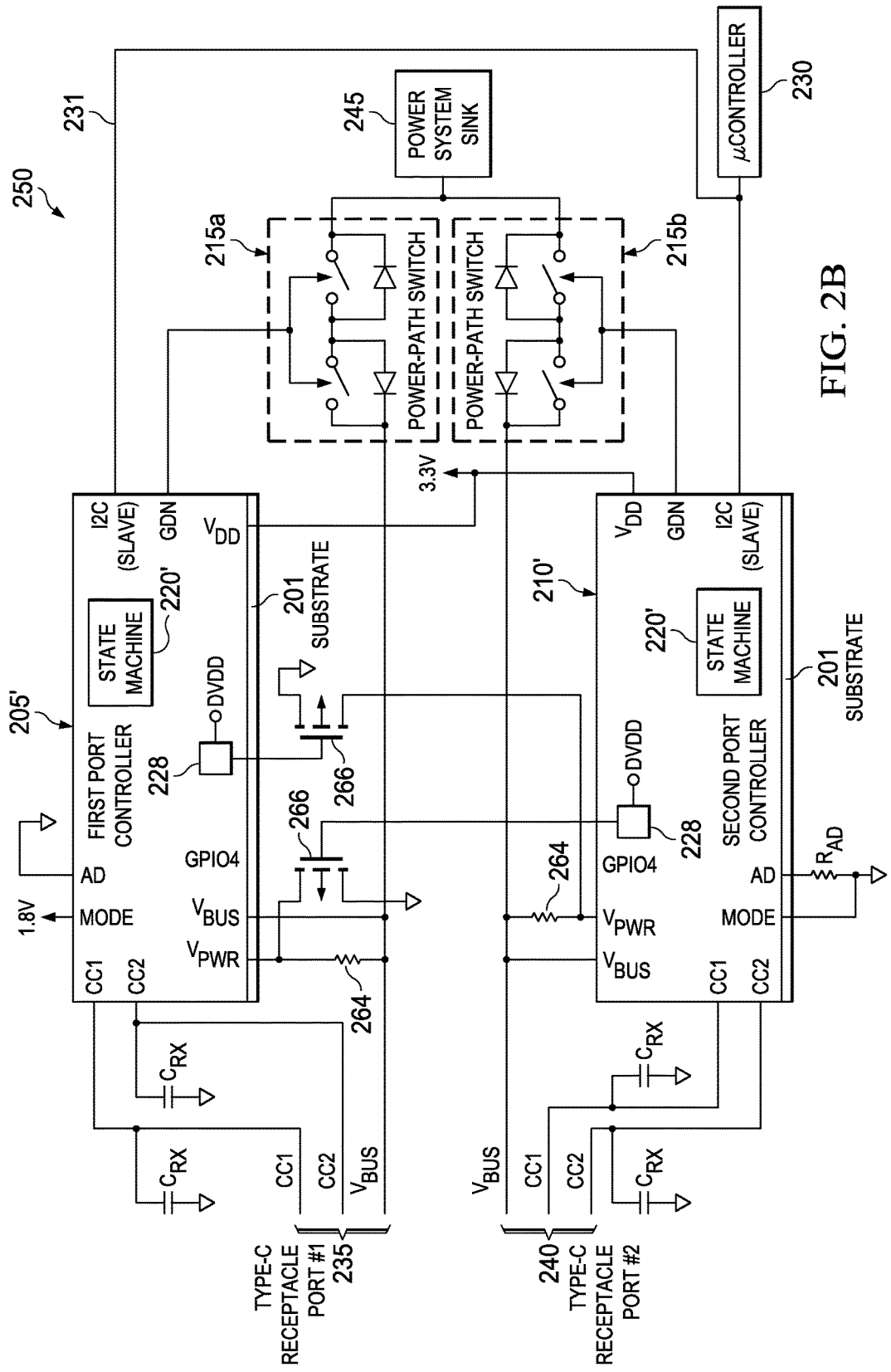
FIG. 2B is a PD system schematic embodiment where the DBC mechanism is implemented by a state machine and the port controller's $V_{PWR}$ pin is connected through a resistor to the $V_{BUS}$ output pin of the receptacles, and the IO pin from one of the port controllers is connected to a gate of a Metal Oxide Semiconductor Field Effect Transistor (MOSFET) for allowing its IO pin to connect to the $V_{PWR}$ pin of the other port controller, according to an example embodiment.

FIG. 2B is a PD system 250 schematic embodiment where the DBC mechanism is implemented by a state machine shown as 220' without the port controller's 205', 210' GPIO4 pins directly connected together as in PD system 200 described above, according to an example embodiment. Instead, for PD system 250 the port controller's 205', 210' $V_{PWR}$ pin is connected through a resistor 264 to the $V_{BUS}$ output pin of a receptacles 235 and 240, and the GPIO4 pin from one of the port controllers 205', 210' is connected to a gate of a MOSFET 266 (shown as P-channel MOSFETs) for allowing its GPIO4 pin to connect to $V_{PWR}$ pin of the other port controller 205', 210'. The cross-connection of GPIO4 and $V_{PWR}$ pins through the MOSFET 266 functions to pull the $V_{PWR}$ pin low of one port controller when the GPIO4 pin of the other port controller is low.

The MOSFET 266 is added because the GPIO4 pin may not be able tolerate the high voltage that the $V_{PWR}$ pin may see during operation, so that the GPIO4 pin instead drives the gate of MOSFET 266 and the drain of the MOSFET 266 is connected to the $V_{PWR}$ pin (and source of the MOSFET 266 to DVDD). It is noted that in the DB scenario VDD will typically be at ground potential. For PD system 250 as with PD system 200 it is the first of the respective port controllers 205', 210' that can provide power to the power system sink which takes control.

The resistor's 264 value utilized can depend on several considerations. The resistor 264 should be small enough so that when the current is flowing through there is not a significant voltage drop across so that the voltage at the $V_{PWR}$ pin is rendered too small. The resistor 264 should also be large enough so that it does not draw more than about 500 mA. So assuming the port controller draws 1 mA through the $V_{PWR}$ pin a resistance for resistor 264 of about 100 ohms will keep the IR drop in normal operation below 100 mV, and the current through the resistor 264 when GPIO4 pin is pulled low will be roughly 50 mA. The power dissipated in the resistor 264 will be about 0.25 W.

Figure 3:
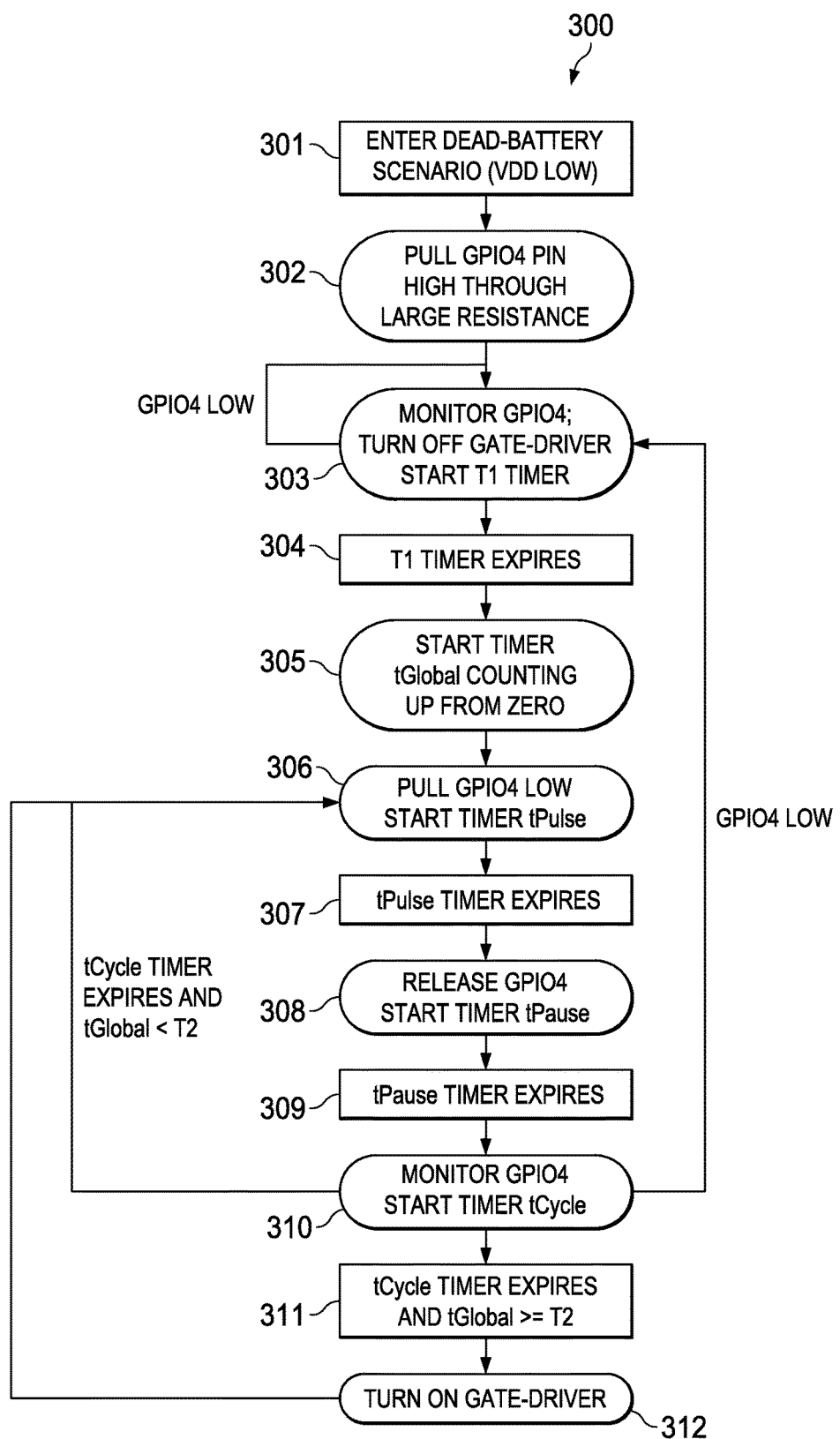
FIG. 3 is a flow chart that shows steps in an example method of PD DBC, according to an example embodiment.

An example port controller coordination method 300 is illustrated in FIG. 3 which utilizes a disclosed port controller(s) having a state-machine 220 within a system arrangement such PD system 200 shown in FIG. 2A described above having port controllers 205 and 210. In step 301 the port controller first enters the DB scenario because it's $V_{BUS}$ and $V_{PWR}$ pins if tied together (or more generally implemented with one of these pins) have been sensed to be high and $V_{DD}$ shown biased at a nominal 3.3 volts is sensed to be low. Step 302 comprises the port controller pulling up on its GPIO pin shown as a GPIO4 pin through a large resistance shown as provided by the internal pull-up block 228 in FIG. 2A.

Step 303 comprises the port controller starting a timer set for time period T1 (T1 timer) and monitoring its GPIO4 pin for the time period T1. If the GPIO4 pin is pulled low indicating that another port controller is supplying power to the power system sink (load) at any time during T1 then the port controller either resets so that the port controller goes to sleep (shuts off all internal circuitry and places itself in a low-current standby mode to conserve power) for some time, then starts method 300 over again where the state machine can either return to step 303 if GPIO4 is low or go into a low-power state for a short time then return to step 301. Alternatively, the state machine can continue to monitor its GPIO4 pin until it is not pulled low for at least the duration T1. If the GPIO4 pin was not low for at least time T1 so that the T1 timer expires (step 304), then in step 305 another timer tGlobal starts counting up from zero.

Next, in step 306 the GPIO4 pin is pulled low for a time tPulse and a tPulse timer is started. After a time of tPulse has elapsed, the tPulse timer expires in step 307, and in step 308 the GPIO4 pin is released (pulled low) and given a time tPause timed by a tPause timer to rise to the pullup voltage. In step 309 the tPause timer expires. Then in step 310 the GPIO4 pin is monitored for a time tCycle and a tCycle timer started, and if the GPIO4 pin goes low at any time while being monitored in this state indicating the other port controller is currently supplying power to the power system sink, the port controller either resets and returns to the beginning of method 300 (i.e., after going to sleep to save power for some time) or as shown in FIG. 3 returns to step 303 including turning off its gate driver pin (in case it was turned on prior).

After a time of tCycle elapses if the tGlobal timer is greater than a time T2 shown as step 311, then the GDN pin is turned on in step 312 which results in its associated power path switch 215a or 215b closing so that the power on its $V_{BUS}$ pin is supplied to the power system sink (or load) 245. Otherwise if in step 310 tGlobal is found to be less than T2 and the tGlobal timer expires the method returns to step 306 where the GPIO4 pin is pulsed low again and the tPulse timer is again started. Following step 312 (GDN gate driver pin turned on) the method again returns to step 306 where the GPIO4 pin is pulsed low again and the tPulse timer is started.

The time tCycle used in step 310 is unique for each port controller 205 and 210 to guarantee collisions are avoided, since each port controller can have a unique I2C slave address in this system (e.g., set by the bias applied to the MODE or AD pins) that is used to determine unique tCycle values for each port controller to hard code the I2C slave address into the port controllers. Each port controller can use the same respective values for tPulse, tPause, T1, tGlobal, and T2. The difference between each tCycle time for the respective port controllers should be larger than the time required for the DBC wire 241 to rise to its high voltage level after being pulled low. Larger values of the time tPulse make implementations easier, but require a longer time before the GDN pin will be turned on. The time T1 should be longer than the longest value of tCycle plus tPulse. The time T2 provides extra margin against any practical issues such as both port controllers starting their first pulse at exactly the same time and may be set to the same value as T1.

For PD system 250, the state-machine 220' functions largely the same as port controller coordination method 300 for port controllers 205 and 210 in PD system 200 described above relative to FIG. 3 except for PD system 250 there is no need for the state machine 220' to monitor its GPIO4 pin. Accordingly, in step 303 there is no need for the state machine 220' to monitor the GPIO4 pin, just delay for T1. When GPIO4 pin would have been pulled low in step 304 in method 300, the $V_{PWR}$ pin would be pulled low instead which will cause the port controller to reset. Likewise in step 310 there is no need to monitor the GPIO4 pin.

The port controller may also only enter into the DB scenario as described above if the power source it is connected to via the receptacle is able to provide sufficient power for the system. An example power source is an AC/DC power supply that is connected through the receptacle. For example, some USB Type-C downward facing ports are only capable of supplying about 900 mA. In some systems that the available power is not sufficient, the port controllers in those systems may be connected to a downward facing port capable of supplying 1.5 A or 3 A before pulling GPIO4 low or turning on its gate driver pin. In such systems when less than 1.5 A (or some other minimum threshold current level) is available from the power source the port controller can go to sleep for a short time and then retry since the attached power source (e.g. an adaptor connected through the receptacle) can increase the current it is advertising (providing) at any time.

Disclosed port controllers in one particular application may be embodied as a 2.5-V to 18-V High-Efficiency Adjustable Power-Limiting Hot-Swap Controller With Current Monitor and Overvoltage Protection that has a gate driver pin for driving the gate(s) of N-channel MOSFETs for external power-path switches. Other example applications include notebook/laptop computers with multiple USB Type-C ports. One particular example port controller includes two pins for controlling the external N-channel MOSFETs (of power-path switches), Over Voltage Protection (OVP) and Over Current Protection (OCP) protection, and a USB PD physical layer.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A method of power delivery, comprising:
providing a first port controller and at least a second port controller each including a state machine, an input/output (IO) pin, at least one receptacle supply pin ($V_{BUS}$ pin and/or $V_{PWR}$ pin) coupled to receive power from a voltage bus ($V_{BUS}$) output pin of a receptacle, a VDD supply pin coupled to a VDD supply, and a gate driver pin coupled to one or more control nodes of at least one power path switch that has an output coupled to a power system sink, said first and second port controllers each having a control input coupled to a control output of a processor which serves as their master;
said state machine implementing a dead-battery control (DBC) algorithm upon sensing a dead-battery condition comprising sensing a voltage on said receptacle supply pin and a lack of voltage on said VDD supply pin, said DBC algorithm:
pulling up said IO pin;
starting a timer set for a time period T1 (T1 timer) and monitoring said IO pin for said T1;
wherein if said IO pin is pulled low resetting said first port controller or said second port controller for a pull low period and then restarting said DBC algorithm or continuing said monitoring of said IO pin until said IO pin is not pulled low for at least said T1 so that said T1 timer expires;
said first port controller or said second port controller pulling its said IO pin low for an assertion period of time to claim priority over another of said first and said second port controller, and
sending a control signal by turning on said gate driver pin to close its associated one of said power path switches to exclusively provide said power to said power system sink.

2. The method of claim 1, wherein said receptacle comprises a Universal Serial Bus (USB) Type-C receptacle.

3. The method of claim 1, wherein said IO pin of said first port controller is directly connected to said IO pin of said second port controller.

4. The method of claim 1, wherein said IO pin and said receptacle supply pin are cross-connected between said first port controller and said second port controller through a MOSFET for pulling said receptacle supply pin low from one of said port controllers when said IO pin of another of said port controllers is low.

5. The method of claim 1, further comprising repeating said pulling its said IO pin low periodically with a period (tCycle) based a unique Inter Integrated Circuit Communications (I2C) slave address hard coded into said first port controller and said second port controller for preventing another of said first or said second port controller from turning on said gate driver pin.

6. The method of claim 1, wherein a current received from a power source is determined to be below a minimum threshold current level, entering a low power mode for a predetermine period of time then resetting.

7. The method of claim 5, wherein said tCycle is based on said I2C slave address.

8. The method of claim 5, wherein said first port controller and said second port controller are each integrated circuits (ICs) formed on a substrate having a silicon surface.

9. A port controller, comprising:
a state machine;
an input/output (TO) pin, at least one receptacle supply pin for receiving power from a voltage bus ($V_{BUS}$) output pin of a receptacle;
a VDD supply pin for coupling to a VDD supply, and a gate driver pin for driving one or more control nodes of at least one power path switch that has an output coupled to a power system sink;
a control input (I2C) for coupling to a control output of a processor which serves a master;
said state machine implementing a dead-battery control (DBC) algorithm upon sensing a DB condition comprising sensing a voltage on said receptacle supply pin and a lack of voltage on said VDD supply pin, said DBC algorithm for implementing:
pulling up said IO pin;
starting a timer set for a time period T1 (T1 timer) and monitoring said IO pin for said T1;

wherein if said IO pin is pulled low resetting for a pull low period and then restarting said DBC algorithm or continuing said monitoring of said IO pin until said IO pin is not pulled low for at least said T1 so that said T1 timer expires;

pulling its said IO pin low for an assertion period of time to claim priority over another port controller that has another gate driver pin for driving one or more control nodes of at least another power path switch that has another output also coupled to said power system sink, and sending a control signal by turning on said gate driver pin to close said power path switch to exclusively provide said power to said power system sink.

10. The port controller of claim 9, wherein said DBC algorithm is for further implementing repeating said pulling its said IO pin low periodically with a period (tCycle) based a unique Inter Integrated Circuit Communications (I2C) slave address hard coded therein for preventing said another port controller from turning on said another gate driver pin.

11. The port controller of claim 9, wherein said DBC algorithm is for further implementing wherein a current received from a power source is determined to be below a minimum threshold current level, entering a low power mode for a predetermine period of time then resetting.

12. The port controller of claim 10, wherein said tCycle is based on said I2C slave address.

13. The port controller of claim 9, wherein said port controller is an integrated circuit (IC) formed on a substrate having a silicon surface.

* * * * *